H. SCHNEIDER.
STONE GATHERING IMPLEMENT.
APPLICATION FILED APR. 9, 1912.
1,050,396.
Patented Jan. 14, 1913.
2 SHEETS—SHEET 1.
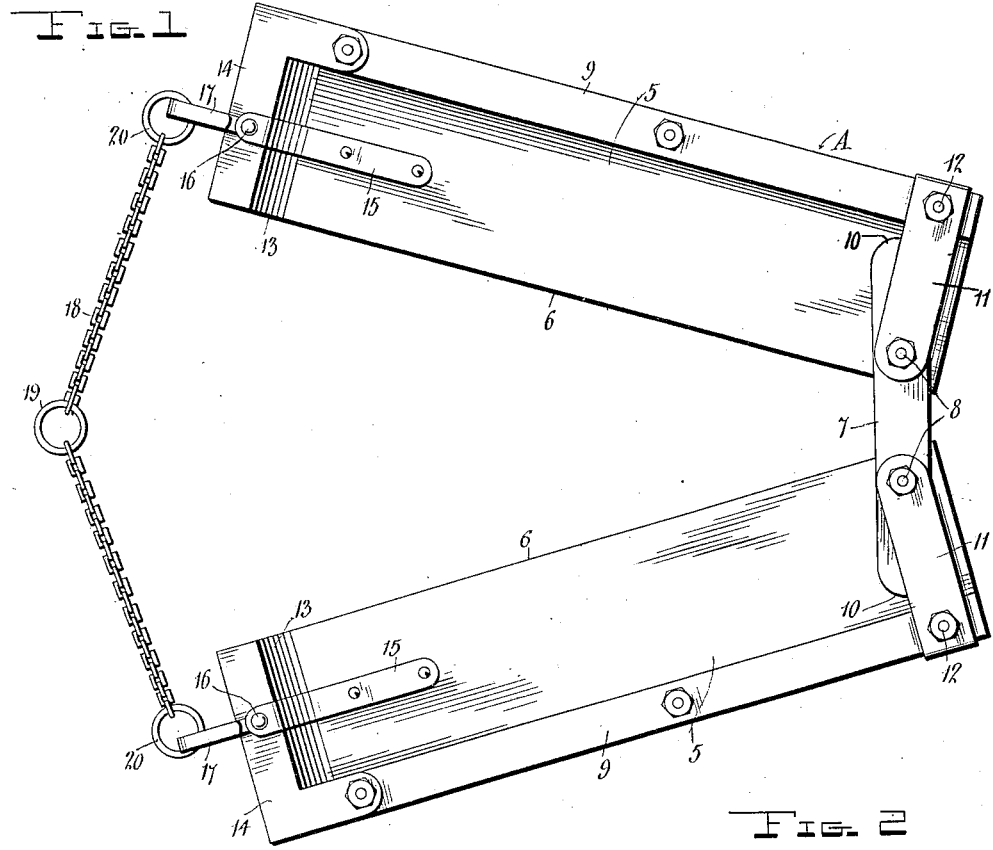
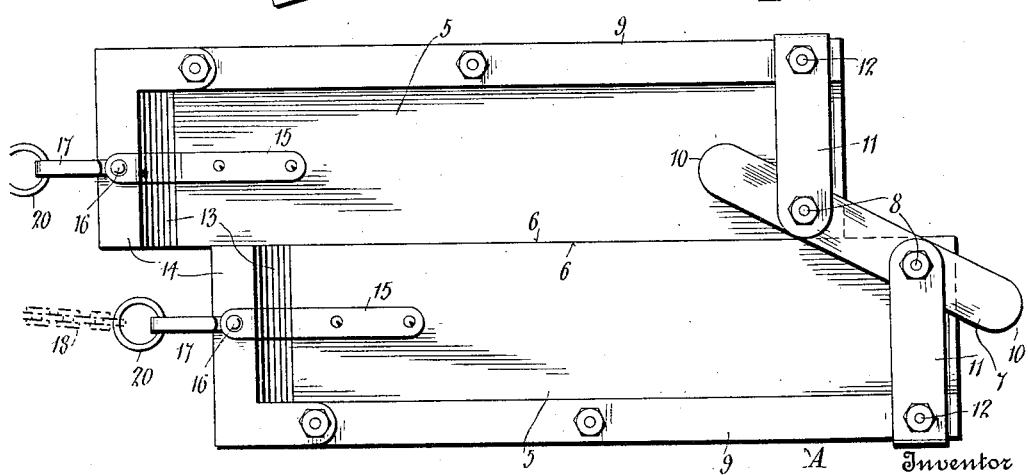
Witnesses
Inventor
H. Schneider,
By
Attorneys

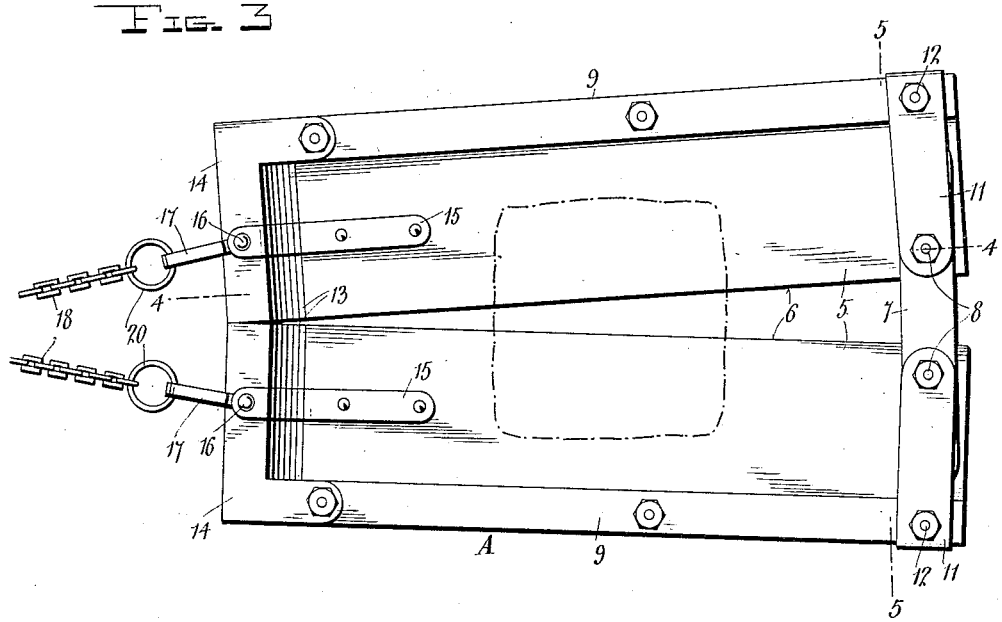
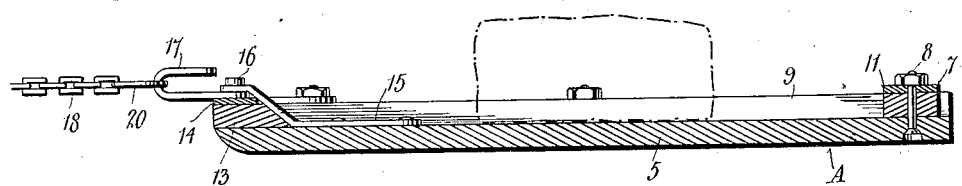
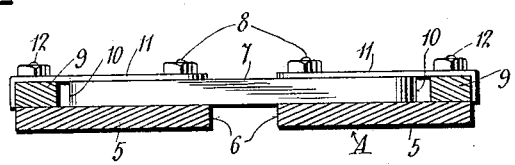

UNITED STATES PATENT OFFICE.

HENRY SCHNEIDER, OF ALDEN, MINNESOTA.

STONE-GATHERING IMPLEMENT.

1,050,396.  Specification of Letters Patent.  Patented Jan. 14, 1913.

Application filed April 9, 1912. Serial No. 689,468.

*To all whom it may concern:*

Be it known that I, HENRY SCHNEIDER, a citizen of the United States, residing at Alden, in the county of Freeborn, State of Minnesota, have invented certain new and useful Improvements in Stone-Gathering Implements; and I do hereby declare the following to be a full, clear, and exact description of the invention, such as will enable others skilled in the art to which it appertains to make and use the same.

This invention relates to improvements in stone gathering vehicles.

The principal object of the invention is to provide a horse drawn vehicle by means of which stones of considerable weight may be readily loaded without manual assistance.

Another object of the invention is to provide a vehicle of the character described by means of which the stones may be unloaded by horse power.

A further object of the invention is to provide a vehicle for the purpose described which is composed of a minimum number of parts, is therefore simple in construction, is practical in operation, and is cheap to manufacture.

With these and other objects in view, the invention consists in the construction and novel combination of parts hereinafter fully described, illustrated in the accompanying drawings and pointed out in the claim hereto appended; it being understood that various changes in the form, proportion, size and minor details of construction within the scope of the claim may be resorted to without departing from the spirit or sacrificing any of the advantages of the invention.

In the drawings: Figure 1 is a top plan view of the vehicle showing the same in position previous to the loading of a stone, Fig. 2 is a similar view showing the sections of the vehicle disposed in abutting relation, Fig. 3 is a plan view showing the normal positions of the vehicle sections showing the transportation of a stone, Fig. 4 is a longitudinal sectional view taken on the line 4—4 of Fig. 3, and Fig. 5 is a transverse sectional view taken on the line 5—5 of Fig. 3.

Like reference numerals designate corresponding parts in all the figures of the drawings.

Referring to the drawings, the invention comprises a vehicle which is designated as a whole by the reference letter A. This vehicle comprises an opposed pair of skid sections 5—5, the inner longitudinal edges 6—6 thereof being disposed in spaced relation. These sections are held in such relation by means of a transverse bar 7 which extends across the rear ends of the sections and has pivotal connections with the rear inner corners of the sections by means of bolts 8. Longitudinal side walls 9—9 are respectively connected to the outer longitudinal edges of the sections 5, and the ends of the bars 7 are rounded, as at 10—10, to permit of said bars swinging, as will be hereinafter described.

In order to retain the respective sections and the bar 7 firmly, there is provided a pair of reinforcing plates 11—11. Each plate has one end secured to the bar 7 by the pivot bolt 8 and its other end secured to a respective side board 9 by means of a bolt 12. Secured to the front edges of each section 5 is an end board 13, and secured to each end board and adjacent side board 9 is an angle reinforcing plate 14. A strap 15 has its major portion secured centrally to a respective section 5 at its forward end, and the forward end of each strap projects above and in spaced relation to a respective front board 13. A bolt 16 passes through the lower end of each strap 15, and is engaged with a respective end board 13. A forwardly extending hook 17 has its rear end pivotally connected to a respective bolt 16 for horizontal swinging movements.

A draft chain 18 is centrally formed with an attaching ring 19 and at its ends with attaching rings 20—20, the former being adapted for engagement with a draft element of any suitable type while the latter are adapted for engagement with the hooks 17.

In operation, when it is desired to load and transport a heavy stone, the sections are swung outwardly upon the pivots 8 so as to dispose the stone to be loaded intermediate the sections, as is clearly shown by reference to Fig. 1 of the drawings. Upon forward movement of the draft animals, the sections 5 will be drawn together until the inner longitudinal edges 6 of the sections engage the stone. Upon continued forward movement of the animals, one of the sections 5 will be drawn in advance of the other, and at the same time this section will be drawn to abut the other section, as is clearly shown in Fig. 2 of the drawings.

This movement of the sections causes the stone to be lifted and consequently loaded upon the sections. Upon continued forward movement of the animals, the forward sections 5 of the vehicle will be brought together to the position shown in Fig. 3 of the drawings. After the stone has been transported to the place desired, one of the rings 20 is detached from its respective hook 17 and the animals will be moved to swing the opposite section 5 outwardly, and as a result, deposit the stone.

What is claimed is:

In a stone gathering vehicle, the combination with an opposed pair of skid sections, the inner longitudinal edges thereof being normally disposed in spaced relation, side walls connected to the outer longitudinal edges of the section, a transverse bar constituting a rear end wall extending across the rear ends of the sections and having pivotal connection with the inner portions of said sections, and draft means associated with the other ends of the sections.

In testimony whereof, I affix my signature, in presence of two witnesses.

HENRY SCHNEIDER.

Witnesses:
NORMAN E. PETERSON,
ERNEST A. PETERSON.

Copies of this patent may be obtained for five cents each, by addressing the "Commissioner of Patents, Washington, D. C."